(12) United States Patent
Volkhausen

(10) Patent No.: US 11,473,642 B2
(45) Date of Patent: Oct. 18, 2022

(54) VIBRATION DAMPER VALVE ASSEMBLY WITH SWITCHABLE BYPASS

(71) Applicants: ThyssenKrupp Bilstein GmbH, Ennepetal (DE); thyssenkrupp AG, Essen (DE)

(72) Inventor: Dennis Volkhausen, Ennepetal (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/355,369

(22) Filed: Jun. 23, 2021

(65) Prior Publication Data
US 2022/0025951 A1 Jan. 27, 2022

(30) Foreign Application Priority Data

Jul. 23, 2020 (DE) .................... 10 2020 209 288.5

(51) Int. Cl.
*F16F 9/34* (2006.01)
*F16F 9/348* (2006.01)
*F16K 11/10* (2006.01)

(52) U.S. Cl.
CPC .............. *F16F 9/348* (2013.01); *F16K 11/10* (2013.01)

(58) Field of Classification Search
CPC ........ F16F 9/348; F16F 9/5126; B60G 13/08; B60G 2206/41; F16K 11/01
USPC .................................................. 188/322.15
See application file for complete search history.

(56) References Cited

U.S. PATENT DOCUMENTS

| | | | |
|---|---|---|---|
| 10,316,923 B2 * | 6/2019 | Tsuji | F16F 9/44 |
| 10,663,027 B2 * | 5/2020 | Patel | F16F 9/182 |
| 2004/0154663 A1 | 8/2004 | Honig | |
| 2005/0056505 A1 | 3/2005 | Deferme | |
| 2009/0000891 A1 | 1/2009 | Kouyama | |
| 2012/0247889 A1 | 10/2012 | Yabe | |
| 2015/0210136 A1 * | 7/2015 | Teraoka | F16F 9/3487 |
| | | | 188/282.1 |
| 2016/0312851 A1 * | 10/2016 | Hamers | F16F 9/3488 |
| 2017/0114857 A1 * | 4/2017 | Kim | F16F 9/348 |
| 2018/0340588 A1 * | 11/2018 | Chikamatsu | B60G 17/08 |

FOREIGN PATENT DOCUMENTS

| | | |
|---|---|---|
| DE | 10 2012 204 530 A | 10/2012 |
| EP | 1 447 590 B | 4/2005 |
| EP | 1 664 579 B | 10/2012 |

* cited by examiner

*Primary Examiner* — Long T Tran
*Assistant Examiner* — James J Kim
(74) *Attorney, Agent, or Firm* — thyssenkrupp North America, LLC

(57) ABSTRACT

A vibration damper valve assembly may include a valve main body, first and second main stage flow paths, first and second disc valve packs, and first and second main stage bypass flow paths. The first disc valve pack may include a first outer disc valve pack, a first flow path bypass disc, a first loading element, and a first covering element, with the first loading element being arranged on one side of the first covering element such that a loading force is formed on the first covering element. The second disc valve pack may include a second outer disc valve pack, a second flow path bypass disc, a second loading element, and a second covering element, with the second loading element being arranged on one side of the second covering element such that a loading force is formed on the second covering element.

9 Claims, 1 Drawing Sheet

VIBRATION DAMPER VALVE ASSEMBLY WITH SWITCHABLE BYPASS

CROSS REFERENCE TO RELATED APPLICATION

This application is a non-provisional application claiming priority to German Patent Application No. DE 10 2020 209 288.5, which was filed Jul. 23, 2020, the entire contents of which are hereby incorporated by reference herein.

FIELD

The present disclosure generally relates to vibration damper valve assemblies, to disc valve packs, and to vibration dampers for vehicles.

BACKGROUND

Vibration damper valve assemblies, disc valve assemblies, and vibration dampers are known from the prior art.

European Patent No. EP 1 664 579 A1 discloses a single-tube piston valve system with selective venting.

One problem with the embodiments known from the prior art is that they are usually of complex design, complicated, are not of compact construction and do not have a space-saving design.

Moreover, flow bypass channels are usually difficult to adjust and can only be adjusted in a limited range, depending on their design configurations and their associated flow directions. Furthermore, the bypass window size cannot be adjusted independently for each flow direction, in particular the pressure and tension stage.

Thus, a need exists for an improved vibration damper valve assembly, an improved disc valve pack, and an improved vibration damper, in which the abovementioned disadvantages are avoided. In particular, an improved vibration damper valve assembly, an improved disc valve pack, and an improved vibration damper should make possible volume-flow-dependent bypass control independently of the flow direction and should make available short response times at the same time in the case of low-frequency excitations with low amplitudes, and improved insulation from high-frequency road signals.

DETAILED DESCRIPTION

Figure 1:
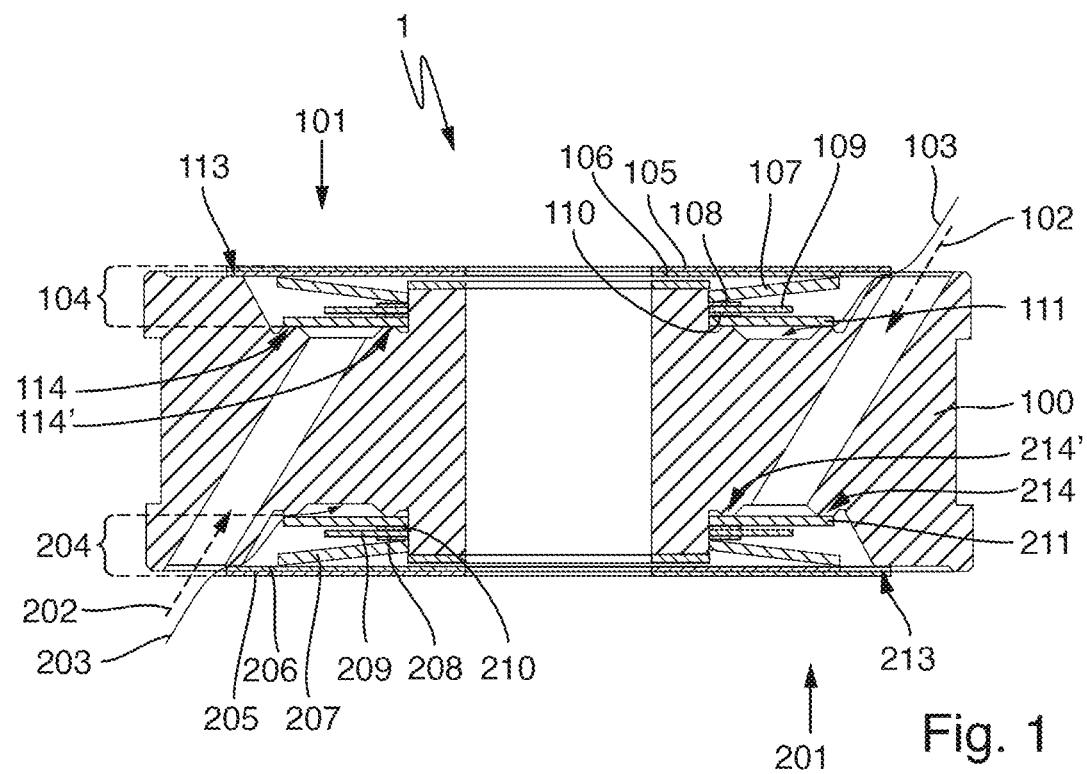
FIG. 1 is a schematic longitudinal sectional view of an example vibration damper valve assembly.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The vibration damper valve assembly according to the examples of the present disclosure, the disc valve pack according to the examples of the present disclosure, and the vibration damper according to the examples of the present disclosure have the advantage over conventional embodiments of short response times at the same time in the case of low-frequency excitations with low amplitudes, and maximum insulation potential in the case of high-frequency excitations with low amplitudes, i.e. without loss of comfort or deterioration in other driving behaviours and/or situations. In addition, a single flow path for the main flow path of the tension stage to the bypass flow path of the pressure stage and/or the main flow path of the pressure stage to the bypass flow path of the tension stage can be achieved with a fluidic connection. Furthermore, a structurally simple, compact construction and a space-saving design can be achieved. In addition, the embodiment according to the invention can be integrated into existing vibration dampers, in particular valve assemblies, and the aforementioned additional functions can advantageously be implemented with the same installation space. Further advantages are shorter response behaviours, shorter valve response times, in particular shorter valve switching times, and direct valve feedback. Furthermore, the volume-flow-dependent bypass window size can advantageously be adjusted independently for each flow direction, in particular the pressure and tension stage.

The vibration damper valve assembly in one example, in particular piston assembly, comprises:
a valve main body, in particular a piston, having a first surface and an opposed/opposite second surface,
a first main stage flow path, which extends through a first fluid passage from the first surface to the second surface in the through-flow direction,
a second main stage flow path, which extends through a second fluid passage from the second surface to the first surface in the through-flow direction,
a first disc valve pack, which is arranged on the first surface for the purpose of controlling the flow of the second main stage flow path,
a second disc valve pack, which is arranged on the second surface for the purpose of controlling the flow of the first main stage flow path,
a first main stage bypass flow path, which extends through a fluid passage from the first surface to the second surface in the through-flow direction,
a second main stage bypass flow path, which extends through a fluid passage from the second surface to the first surface in the through-flow direction, wherein the second fluid passage of the second main stage flow path is a fluidic connection to the fluid passage of the first main stage bypass flow path, wherein the through-flow direction of the second main stage flow path is opposed to the through-flow direction of the first main stage bypass flow path, wherein the first disc valve pack controls the through-flow of the second main stage flow path and of the first main stage bypass flow path,
and/or
the first fluid passage of the first main stage flow path is a fluidic connection to the fluid passage of the second main stage bypass flow path, wherein the through-flow direction of the first main stage flow path is opposed to the through-flow direction of the second main stage bypass flow path, wherein the second disc valve pack controls the through-flow of the first main stage flow path and of the second main stage bypass flow path, wherein the first disc valve pack, arranged in the following order in the direction from the first surface to the valve main body centre, comprises: a first outer disc valve pack, a first flow path bypass disc, a first loading element and a first covering element for covering the outlet side of the second main stage flow path, wherein the first loading element is arranged on one side of the first covering element in such a way that a loading force is formed on the first covering element, and/or the second disc valve pack, arranged in the following order in the direction from the second surface to the valve main body centre, comprises: a second outer disc valve pack, a second flow path bypass disc, a second loading element and a second covering element for covering the outlet side of the first main stage flow path, wherein the second loading element is arranged on one side of the second covering element in such a way that a loading force is formed on the second covering element.

The disc valve pack according to the invention for arrangement in a vibration damper valve assembly, in particular a piston assembly, comprising:
 a valve main body, in particular a piston, having a first surface and an opposed/opposite second surface,
 a first main stage flow path, which extends through a first fluid passage from the first surface to the second surface in the through-flow direction,
 a second main stage flow path, which extends through a second fluid passage from the second surface to the first surface in the through-flow direction,
 a first disc valve pack, which is arranged on the first surface for the purpose of controlling the flow of the second main stage flow path,
 a second disc valve pack, which is arranged on the second surface for the purpose of controlling the flow of the first main stage flow path,
 a first main stage bypass flow path, which extends through a fluid passage from the first surface to the second surface in the through-flow direction,
 a second main stage bypass flow path, which extends through a fluid passage from the second surface to the first surface in the through-flow direction,
wherein the second fluid passage of the second main stage flow path is a fluidic connection to the fluid passage of the first main stage bypass flow path, wherein the through-flow direction of the second main stage flow path is opposed to the through-flow direction of the first main stage bypass flow path, wherein the first disc valve pack controls the through-flow of the second main stage flow path and of the first main stage bypass flow path, and/or the first fluid passage of the first main stage flow path is a fluidic connection to the fluid passage of the second main stage bypass flow path, wherein the through-flow direction of the first main stage flow path is opposed to the through-flow direction of the second main stage bypass flow path, wherein the second disc valve pack controls the through-flow of the first main stage flow path and of the second main stage bypass flow path, wherein the first disc valve pack, arranged in the following order in the direction from the first surface to the valve main body centre, comprises: a first outer disc valve pack, a first flow path bypass disc, a first loading element and a first covering element for covering the outlet side of the second main stage flow path, wherein the first loading element is arranged on one side of the first covering element in such a way that a loading force is formed on the first covering element, and/or the second disc valve pack, arranged in the following order in the direction from the second surface to the valve main body centre, comprises: a second outer disc valve pack, a second flow path bypass disc, a second loading element and a second covering element for covering the outlet side of the first main stage flow path, wherein the second loading element is arranged on one side of the second covering element in such a way that a loading force is formed on the second covering element.

The vibration damper according to the invention comprises a vibration damper valve assembly, in particular a piston assembly, comprising:
 a valve main body, in particular a piston, having a first surface and an opposed/opposite second surface,
 a first main stage flow path, which extends through a first fluid passage from the first surface to the second surface in the through-flow direction,
 a second main stage flow path, which extends through a second fluid passage from the second surface to the first surface in the through-flow direction,
 a first disc valve pack, which is arranged on the first surface for the purpose of controlling the flow of the second main stage flow path,
 a second disc valve pack, which is arranged on the second surface for the purpose of controlling the flow of the first main stage flow path,
 a first main stage bypass flow path, which extends through a fluid passage from the first surface to the second surface in the through-flow direction,
 a second main stage bypass flow path, which extends through a fluid passage from the second surface to the first surface in the through-flow direction,
wherein the second fluid passage of the second main stage flow path is a fluidic connection to the fluid passage of the first main stage bypass flow path, wherein the through-flow direction of the second main stage flow path is opposed to the through-flow direction of the first main stage bypass flow path, wherein the first disc valve pack controls the through-flow of the second main stage flow path and of the first main stage bypass flow path, and/or the first fluid passage of the first main stage flow path is a fluidic connection to the fluid passage of the second main stage bypass flow path, wherein the through-flow direction of the first main stage flow path is opposed to the through-flow direction of the second main stage bypass flow path, wherein the second disc valve pack controls the through-flow of the first main stage flow path and of the second main stage bypass flow path, wherein the first disc valve pack, arranged in the following order in the direction from the first surface to the valve main body centre, comprises: a first outer disc valve pack, a first flow path bypass disc, a first loading element and a first covering element for covering the outlet side of the second main stage flow path, wherein the first loading element is arranged on one side of the first covering element in such a way that a loading force is formed on the first covering element, and/or the second disc valve pack, arranged in the following order in the direction from the second surface to the valve main body centre, comprises: a second outer disc valve pack, a second flow path bypass disc, a second loading element and a second covering element for covering the outlet side of the first main stage flow path, wherein the second loading element is arranged on one side of the second covering element in such a way that a loading force is formed on the second covering element.

The invention can be implemented in a vibration damper valve assembly, a disc valve pack and a vibration damper for vehicles, in particular motor vehicles or a combination thereof.

Within the scope of the present invention, it is also possible, in particular, for a vibration damper valve assembly to be designed as a piston assembly, such as a working piston of a vibration damper, for example.

Within the scope of the present invention, a valve main body can also be embodied, in particular, as a piston, for example also as a working piston.

Within the scope of the present invention, a surface is understood as a plane, in particular a side of a valve main body, which can be acted upon by a flow, in particular the flow of a damping medium.

Within the scope of the present invention, a fluidic connection is understood to mean the same fluidic connection, in particular this one and the same fluidic connection can comprise opposed flow directions, for example the identical fluidic connection with opposed flow directions. For example, the main flow path of the tension stage can be fluidically connected to the bypass flow path of the pressure stage and/or, conversely, the main flow path of the pressure stage can be fluidically connected to the bypass flow path of the tension stage, in particular fluidically operatively coupled in an alternating action, for example operatively fluidically in opposite directions.

In the context of the present invention, an outer disc valve pack is understood to mean one or more valve discs.

In the context of the present invention, a loading element is understood to mean an element by means of which a force, in particular a preload, can be exerted on other elements. A loading element can be selected, for example, from a Belleville spring, in particular an annular Belleville spring, an elastomer, a finger spring washer, a spiral spring, a spiral disc spring, a corrugated spring washer, a truncated cone spring, a flat shaped spring or a combination thereof.

In the context of the present invention, a first covering element for covering the outlet side of the second main stage flow path is understood, for example, to mean an annular disc with a passage opening for the second flow path, in particular a pre-stage bypass disc.

In the context of the present invention, a second covering element for covering the outlet side of the first main stage flow path is understood, for example, to mean an annular disc with a passage opening for the second flow path, in particular a pre-stage bypass disc.

In another preferred embodiment of the invention, the first disc valve pack is designed in such a way that, in a primary operating state, the side of the first covering element on which no loading force is formed by the first loading element partially no longer covers the outlet side of the second main stage flow path and, in a secondary operating state, additionally the side of the first covering element on which the loading force is formed by the first loading element completely no longer covers the outlet side of the second main stage flow path,
and/or
the second disc valve pack is designed in such a way that, in a primary operating state, the side of the second covering element on which no loading force is formed by the second loading element partially no longer covers the outlet side of the first main stage flow path and, in a secondary operating state, additionally the side of the second covering element on which the loading force is formed by the second loading element completely no longer covers the outlet side of the first main stage flow path.

According to another preferred embodiment of the invention, the one-sided arrangement of the first loading element on the first covering element is on the side facing the valve main body centre,
and/or
the one-sided arrangement of the second loading element is on the side facing the valve main body centre.

According to another preferred embodiment of the invention, the first covering element has a passage opening for flow through the first main stage bypass flow path, wherein the passage opening has a passage area which is smaller than the cross-sectional area of the first main stage bypass flow path,
and/or
the second covering element has a passage opening for flow through the second main stage bypass flow path, wherein the passage opening has a passage area which is smaller than the cross-sectional area of the second main stage bypass flow path.

In another preferred embodiment of the invention, the first disc valve pack, arranged in the following order in the direction from the first surface to the valve main body centre, between the first loading element and the first covering element for covering the outlet side of the second main stage flow path, additionally comprises a first closing element for covering the passage opening of the first covering element,
and/or
the second disc valve pack, arranged in the following order in the direction from the second surface to the valve main body centre, between the second loading element and the second covering element for covering the outlet side of the first main stage flow path, additionally comprises a second closing element for covering the passage opening of the second covering element.

In the context of the present invention, a closing element is understood to mean an element for completely or partially covering the passage opening of the covering element. For example, the closing element can be designed as an annular closing disc.

According to another preferred embodiment of the invention, the first disc valve pack, arranged in the following order in the direction from the first surface to the valve main body centre, between the first closing element for covering the passage opening of the first covering element and the first covering element for covering the outlet side of the second main stage flow path, additionally comprises a first spacer element for spacing the first closing element, and/or
the second disc valve pack, arranged in the following order in the direction from the second surface to the valve main body centre, between the second closing element for covering the passage opening of the second covering element and the second covering element for covering the outlet side of the first main stage flow path, additionally comprises a second spacer element for spacing the second closing element.

In the context of the present invention, a spacer element is understood, for example, to mean an annular clearance disc.

According to another preferred embodiment of the invention, the first disc valve pack, arranged in the following order in the direction from the first surface to the valve main body centre, between the first loading element and the first closing element for covering the passage opening of the first covering element, additionally comprises a first distance element,
and/or
the second disc valve pack, arranged in the following order in the direction from the second surface (201) to the valve main body centre, between the second loading element and the second closing element for covering the passage opening of the second covering element, additionally comprises a second distance element.

In the context of the present invention, a distance element can also be embodied, in particular, as an annular distance washer.

In the context of the present invention, a supporting edge is understood to mean a geometric shape on which an element matching this supporting edge can rest. For example, a supporting edge can be designed as a supporting rounding.

FIG. 1 illustrates a longitudinal section of a vibration damper valve assembly 1 having a valve main body 100 with a first surface 101 and an opposed/opposite second surface 201 and a first main stage flow path 102 extending through a first fluid passage from the first surface 101 to the second surface 201 in the through-flow direction and a second main stage flow path 202 extending through a second fluid passage from the second surface 201 to the first surface 101 in the through-flow direction. A first disc valve pack 104 for controlling the through-flow of the second main stage flow path 202 is arranged on the first surface 101. A second disc valve pack 204 is arranged on the second surface 201 for controlling the through-flow of the first main stage flow path 102. From the first surface 101 to the second surface 201, a first main stage bypass flow path 103 extends in the through-flow direction as a fluid passage. From the second surface 201 to the first surface 101, a second main stage bypass flow path 203 extends in the through-flow direction as a fluid passage. The second fluid passage of the second main stage flow path 202 is a fluidic connection to the fluid passage of the first main stage bypass flow path 103, and the through-flow direction of the second main stage flow path 202 is opposed to the through-flow direction of the first main stage bypass flow path 103, wherein the first disc valve pack 104 controls the through-flow of the second main stage flow path 202 and of the first main stage bypass flow path 103.

The first fluid passage of the first main stage flow path 102 is a fluidic connection to the fluid passage of the second main stage bypass flow path 203, and the through-flow direction of the first main stage flow path 102 is opposed to the through-flow direction of the second main stage bypass flow path 203, wherein the second disc valve pack 204 controls the through-flow of the first main stage flow path 102 and of the second main stage bypass flow path 203.

The first disc valve pack 104 is arranged in the following order in the direction from the first surface 101 to the valve main body centre and comprises a first outer disc valve pack 105, a first flow path bypass disc 106, a first loading element 107 and a first covering element 111 for covering the outlet side of the second main stage flow path 202, wherein the first loading element 107 is arranged on one side on the first covering element 111 in such a way that a loading force is formed on the first covering element 111.

The first flow path bypass disc 106 rests on the first flow path bypass disc supporting edge 113 during covering.

When the outlet side of the second main stage flow path 202 is covered, the first covering element 111 rests on the first covering element supporting edges 114, 114'.

As illustrated, the first disc valve pack 104 optionally additionally comprises a first distance element 108, a first closing element 109, and a first spacer element 110.

The second disc valve pack 204 is arranged in the following order in the direction from the second surface 201 to the valve main body centre and comprises: a second outer disc valve pack 205, a second flow path bypass disc 206, a second loading element 207 and a second covering element 211 for covering the outlet side of the second main stage flow path 102, wherein the second loading element 207 is arranged on one side on the second covering element 211 in such a way that a loading force is formed on the second covering element 211.

The second flow path bypass disc 206 rests on the second flow path bypass disc supporting edge 213 during covering.

When the outlet side of the first main stage flow path 102 is covered, the second covering element 211 rests on the second covering element supporting edges 214, 214'.

As illustrated, the second disc valve pack 204 optionally additionally comprises a second distance element 208, a second closing element 209, and a second spacer element 210.

Figure 2:
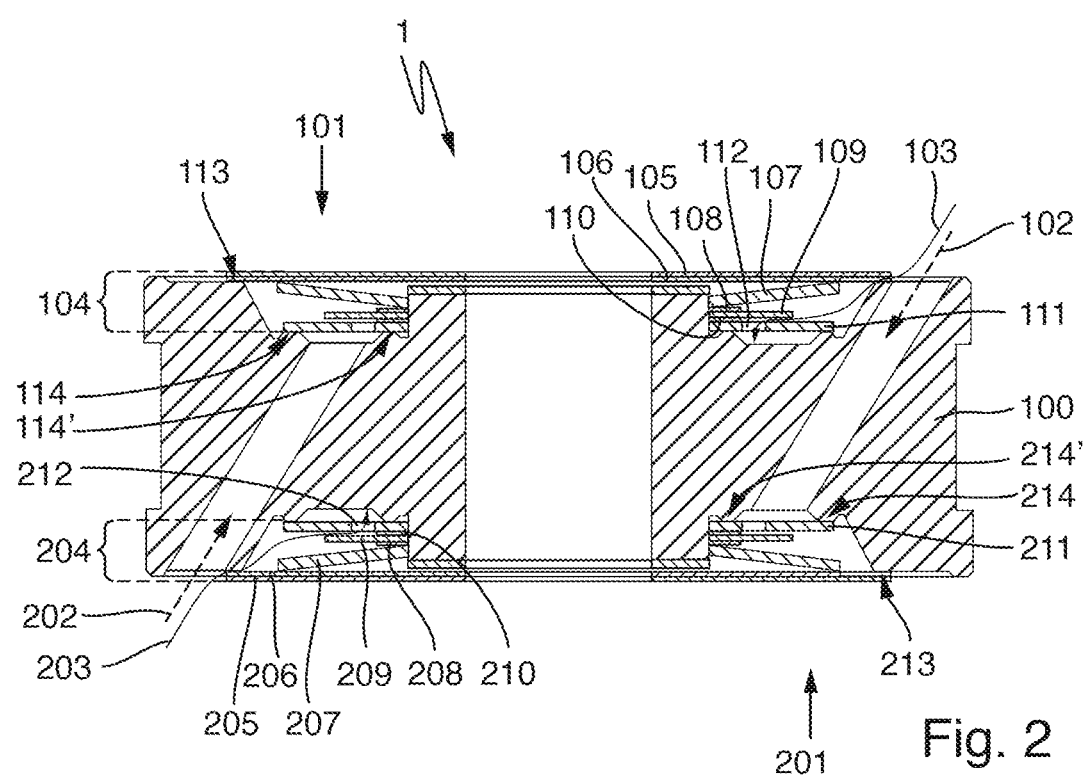
FIG. 2 is schematic longitudinal sectional view of another example vibration damper valve assembly.

FIG. 2 illustrates a longitudinal section of a vibration damper valve assembly 1 according to FIG. 1, wherein the first covering element 111 has a passage opening 112 for flow through the first main stage bypass flow path 103, wherein the passage opening 112 has a passage area which is smaller than the cross-sectional area of the first main stage bypass flow path 103, and the second covering element 211 has a passage opening 212 for flow through the second main stage bypass flow path 203, wherein the passage opening 212 has a passage area which is smaller than the cross-sectional area of the second main stage bypass flow path 203.

Vibration damper valve assemblies, disc valve packs and vibration dampers for vehicles of the type described above are used in the production of vehicles, in particular of running gear assemblies of motor vehicles.

LIST OF REFERENCE SIGNS

1=vibration damper valve assembly,
100=valve main body,
101=first surface,
102=first main stage flow path,
103=first main stage bypass flow path,
104=first disc valve pack,
105=first outer disc valve pack,
106=first flow path bypass disc,
107=first loading element,
108=first distance element,
109=first closing element,
110=first spacer element,
111=first covering element,
112=passage opening of the first covering element
113=first flow path bypass disc supporting edge,
114, 114'=first covering element supporting edges,
201=second surface
202=second main stage flow path
203=second main stage bypass flow path
204=second disc valve pack
205=second outer disc valve pack
206=second flow path bypass disc
207=second loading element,
208=second distance element,
209=second closing element,
210=second spacer element, 211=second covering element
212=passage opening of the second covering element
213=second flow path bypass disc supporting edge,
214, 214'=second covering element supporting edges.

The invention claimed is:

1. A vibration damper valve assembly comprising:
a valve main body that includes a first surface and a second surface that is opposed to or opposite the first surface;
a first main stage flow path that extends through a first fluid passage from the first surface to the second surface in a through-flow direction;
a second main stage flow path that extends through a second fluid passage from the second surface to the first surface in a through-flow direction;
a first disc valve pack that is disposed on the first surface for controlling flow through of the second main stage flow path;
a second disc valve pack that is disposed on the second surface for controlling flow through the first main stage flow path;
a first main stage bypass flow path that extends through one of the fluid passages from the first surface to the second surface in a through-flow direction;
a second main stage bypass flow path that extends through one of the fluid passages from the second surface to the first surface in a through-flow direction,
wherein at least one of:
the second fluid passage of the second main stage flow path is a fluidic connection to the fluid passage of the first main stage bypass flow path, wherein the through-flow direction of the second main stage flow path is opposed to the through-flow direction of the first main stage bypass flow path, wherein the first disc valve pack controls flow through of the second main stage flow path and of the first main stage bypass flow path, or
the first fluid passage of the first main stage flow path is a fluidic connection to the fluid passage of the second main stage bypass flow path, wherein the through-flow direction of the first main stage flow path is opposed to the through-flow direction of the second main stage bypass flow path, wherein the second disc valve pack controls the flow through of the first main stage flow path and of the second main stage bypass flow path;
wherein at least one of:
the second fluid passage of the second main stage flow path is a fluidic connection to the fluid passage of the first main stage bypass flow path, wherein the through-flow direction of the second main stage flow path is opposed to the through-flow direction of the first main stage bypass flow path, wherein the first disc valve pack controls the flow through of the second main stage flow path and of the first main stage bypass flow path, or
the first fluid passage of the first main stage flow path is a fluidic connection to the fluid passage of the second main stage bypass flow path, wherein the through-flow direction of the first main stage flow path is opposed to the through-flow direction of the second main stage bypass flow path, wherein the second disc valve pack controls the flow through of the first main stage flow path and of the second main stage bypass flow path.

2. The vibration damper valve assembly of claim 1 wherein at least one of:
the first disc valve pack is configured such that in a primary operating state a side of a first covering element free of loading force from a first loading element partially no longer covers an outlet side of the second main stage flow path, whereby in a secondary operating state a side of the first covering element on which a loading force is formed by the first loading element completely no longer covers the outlet side of the second main stage flow path; or
the second disc valve pack is configured such that in a primary operating state a side of a second covering element free of loading force from a second loading element partially no longer covers an outlet side of the first main stage flow path, whereby in a secondary operating state a side of the second covering element on which a loading force is formed by the second loading element completely no longer covers the outlet side of the first main stage flow path.

3. The vibration damper valve assembly of claim 2 wherein at least one of:
a one-sided arrangement of the first loading element on the first covering element is on a side that faces a center of the valve main body, or
a one-sided arrangement of the second loading element is on a side that faces a center of the valve main body.

4. The vibration damper valve assembly of claim 2 wherein at least one of:
the first covering element includes a first passage opening for flow through the first main stage bypass flow path, whereby the first passage opening includes a passage area that is smaller than a cross-sectional area of the first main stage bypass flow path, or
the second covering element includes a second passage opening for flow through the second main stage bypass flow path, whereby the second passage opening includes a passage area that is smaller than a cross-sectional area of the second main stage bypass flow path.

5. The vibration damper valve assembly of claim 4 wherein at least one of:
the first disc valve pack, which is arranged in the following order in a direction from the first surface to the center of the valve main body, between the first loading element and the first covering element for covering the outlet side of the second main stage flow path, comprises a first closing element for covering the passage opening of the first covering element, or
the second disc valve pack, which is arranged in the following order in a direction from the second surface to the center of the valve main body, between the second loading element and the second covering element for covering the outlet side of the first main stage flow path, comprises a second closing element for covering the passage opening of the second covering element.

6. The vibration damper valve assembly of claim 5 wherein at least one of:
the first disc valve pack, which is arranged in the following order in the direction from the first surface to the center of the valve main body, between the first closing element for covering the passage opening of the first covering element and the first covering element for covering the outlet side of the second main stage flow path, comprises a first spacer element for spacing the first closing element, or
the second disc valve pack, which is arranged in the following order in the direction from the second surface to the center of the valve main body, between the second closing element for covering the passage opening of the second covering element and the second covering element for covering the outlet side of the first main stage flow path, comprises a second spacer element for spacing the second closing element.

7. The vibration damper valve assembly of claim 6 wherein at least one of:
the first disc valve pack, which is arranged in the following order in the direction from the first surface to the center of the valve main body, between the first loading element and the first closing element for covering the passage opening of the first covering element, comprises a first distance element, or
the second disc valve pack, which is arranged in the following order in the direction from the second surface to the center of the valve main body, between the second loading element and the second closing element for covering the passage opening of the second covering element, comprises a second distance element.

8. A disc valve pack according to claim 1 configured to be arranged in a vibration damper valve assembly.

9. A vibration damper comprising a vibration damper valve assembly according to claim 1.

\* \* \* \* \*